(12) United States Patent
Shimada et al.

(10) Patent No.: US 10,742,539 B2
(45) Date of Patent: Aug. 11, 2020

(54) CONTROL APPARATUS, COMMUNICATION SYSTEM, RELAY APPARATUS CONTROL METHOD, AND PROGRAM

(71) Applicant: NEC Corporation, Tokyo (JP)

(72) Inventors: Nozomi Shimada, Tokyo (JP); Masanori Takashima, Tokyo (JP); Yoji Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/894,632

(22) PCT Filed: May 29, 2014

(86) PCT No.: PCT/JP2014/064239
§ 371 (c)(1),
(2) Date: Nov. 30, 2015

(87) PCT Pub. No.: WO2014/192856
PCT Pub. Date: Dec. 4, 2014

(65) Prior Publication Data
US 2016/0112301 A1    Apr. 21, 2016

(30) Foreign Application Priority Data

May 30, 2013    (JP) .................................. 2013-113842

(51) Int. Cl.
*H04L 12/761* (2013.01)
*H04L 12/715* (2013.01)
(Continued)

(52) U.S. Cl.
CPC .............. *H04L 45/16* (2013.01); *H04L 12/18* (2013.01); *H04L 12/1886* (2013.01);
(Continued)

(58) Field of Classification Search
None
See application file for complete search history.

(56) References Cited

U.S. PATENT DOCUMENTS 5,752,003 A * 5/1998 Hart ........................ G06F 9/542
                                                            709/223
6,831,917 B1 * 12/2004 Cheriton ................. H04L 12/18
                                                            370/392
(Continued)

FOREIGN PATENT DOCUMENTS

CN          101047607 A    10/2007
EP          2 744 159 A1    6/2014
(Continued)

OTHER PUBLICATIONS

Notice of Grounds of Rejection dated Jan. 24, 2017, by the Japanese Patent Office in counterpart Japanese Patent Application No. 2015-519926.
(Continued)

*Primary Examiner* — Faruk Hamza
*Assistant Examiner* — Cassandra L Decker
(74) *Attorney, Agent, or Firm* — Finnegan, Henderson, Farabow, Garrett & Dunner, L.L.P.

(57) ABSTRACT

A control apparatus includes: a first control unit that configures a first virtual network by setting control information in a relay apparatus(es); a multicast group management unit that holds a configuration(s) of a multicast group(s) configured by an apparatus(es) connected to the relay apparatus(es); a multicast path calculation unit that calculates a path(s) for transmitting a multicast packet(s) to the apparatus(es) that belongs to the multicast group(s) on the basis of information about a topology representing a connection relationship about the relay apparatus(es); and a second control unit that sets control information instructing (Continued)

forwarding of the multicast packet(s) along the path(s) in the relay apparatus(es).

13 Claims, 6 Drawing Sheets

(51) Int. Cl.
*H04L 12/18* (2006.01)
*H04L 12/64* (2006.01)
*H04L 12/713* (2013.01)

(52) U.S. Cl.
CPC ........ *H04L 12/6418* (2013.01); *H04L 45/586* (2013.01); *H04L 45/64* (2013.01)

(56) References Cited

U.S. PATENT DOCUMENTS

| | | | |
|---|---|---|---|
| 8,238,337 B1* | 8/2012 | Orr | H04L 12/1886 370/390 |
| 2004/0125803 A1* | 7/2004 | Sangroniz | H04L 12/1886 370/390 |
| 2007/0280236 A1* | 12/2007 | Yang | H04L 12/185 370/390 |
| 2008/0137660 A1* | 6/2008 | Olakangil | H04L 12/1836 370/392 |
| 2009/0025042 A1* | 1/2009 | Lubbers | H04L 12/18 725/70 |
| 2011/0235638 A1* | 9/2011 | Tempia Bonda | H04L 12/18 370/390 |
| 2013/0286844 A1 | 10/2013 | Ishizuka | |

FOREIGN PATENT DOCUMENTS

| | | |
|---|---|---|
| JP | 2003-244210 | 8/2003 |
| JP | 2006-128795 | 5/2006 |
| JP | 2006-277569 | 10/2006 |
| JP | 2008-219426 | 9/2008 |
| JP | 2009-212739 | 9/2009 |
| WO | WO 2012/090993 A1 | 7/2012 |
| WO | WO 2013/022082 | 2/2013 |

OTHER PUBLICATIONS

N. McKeown et al., "OpenFlow: Enabling Innovation in Campus Networks", [online], [searched on May 10, 2013], Internet <URL: http:/www.openflow.org/documents/openflow-wp-latest.pdf>, Mar. 2008.

OpenFlow Switch Specification, Version 1.3.1 (Wire Protocol 0 x 04), [online], [searched on Apr. 10, 2013], Internet <URL: https://www.opennetworking.org/images/stories/downloads/sdn-resources/onf-specifications/openflow/openflow-spec-v1.3.1.pdf>, Sep. 2012.

International Search Report and Written Opinion dated Aug. 19, 2014 in corresponding PCT International Application.

D. Kotani et al., "A design and implementation of OpenFlow Controller handling IP multicast with Fast Tree Switching", Applications and the Internet (Saint), 2012 IEEE/IPSJ 12*th* International Symposium on, pp. 60-67, Jul. 2012.

Extended European Search Report dated Jan. 20, 2017, by the European Patent Office in counterpart European Patent Application No. 14804715.2.

The State Intellectual Property Office of People's Republic of China dated Nov. 16, 2017, from the Chinese Patent Office.

\* cited by examiner

| VIRTUAL NETWORK IDENTIFIER (SEARCH KEY) | MULTICAST GROUP IDENTIFIER (SEARCH KEY) | RECEIVING TERMINAL |
|---|---|---|
| 1202 | 224.0.1.0 | 1106, 1108, 1110, 1119, ······ |
| ⋮ | ⋮ | ⋮ |
| ⋮ | ⋮ | ⋮ |
| 1205 | 224.0.7.0 | 1103, 1106, 1110, 1121, ······ |

CONTROL APPARATUS, COMMUNICATION SYSTEM, RELAY APPARATUS CONTROL METHOD, AND PROGRAM

REFERENCE TO RELATED APPLICATION

The present invention is a National Stage Entry of International Application No. PCT/JP2014/064239, filed May 29, 2014, which is based upon and claims the benefit of the priority of Japanese patent application No. 2013-113842, filed on May 30, 2013, the disclosure of which is incorporated herein in its entirety by reference thereto. The present invention relates to a control apparatus, a communication system, a relay apparatus control method, and a program. In particular, it relates to a control apparatus, a communication system, a relay apparatus control method, and a program that realize multicast.

FIELD

Background

Generally, a conventional IP (Internet Protocol) network is divided into a plurality of subnets. For unicast forwarding between subnets, a routing protocol such as OSPF (Open Shortest Path First) or RIP (Routing Information Protocol) is used. Multicast forwarding is also performed on the same network as that on which unicast forwarding is performed, and a multicast routing protocol such as PIM (Protocol Independent Multicast) is used.

NPL 1 proposes a technique called OpenFlow in which a centralized-control-type network is enabled by using switches that are called OpenFlow switches and an OpenFlow controller that controls these switches in a centralized manner. OpenFlow recognizes communications as end-to-end flows and performs path control, failure recovery, load balancing, and optimization on a per-flow basis. An OpenFlow switch standardized in NPL 2 has a secure channel for communication with an OpenFlow controller and operates according to a flow table suitably added or rewritten by the OpenFlow controller. In the flow table, a set of the following three is defined for each flow: match conditions (Match Fields) against which packet header information is matched; flow statistical information (Counters); and an instruction(s) (Instructions) that defines a processing content(s) (see section "5.2 Flow Table" in NPL 2).

For example, when an OpenFlow switch receives a packet, the OpenFlow switch searches its flow table for an entry having match conditions (see "5.3 Matching" in NPL 2) that match header information of the received packet. As a result of the search, if the OpenFlow switch finds an entry that matches the received packet, the OpenFlow switch updates its flow statistical information (Counters) and processes the received packet on the basis of the processing content(s) (for example, packet transmission from a specified port, flooding, or dropping) written in the instruction field of the entry. If, as a result of the search, the OpenFlow switch does not find an entry that matches the received packet, the OpenFlow switch requests the OpenFlow controller to set an entry, namely, transmits a control information transmission request (Packet-In message) for processing the received packet to the OpenFlow controller via the corresponding secure channel. The OpenFlow switch receives a flow entry in which a processing content(s) is defined and updates its flow table. In this way, an individual OpenFlow switch performs packet forwarding by using an entry stored in its flow table as control information.

Non Patent Literature (NPL) 1: Nick McKeown, and seven others, "OpenFlow: Enabling Innovation in Campus Networks," [online], [searched on May 10, 2013], Internet <URL:http://www.openflow.org/documents/openflow-wp-latest.pdf>

NPL 2: "OpenFlow Switch Specification" Version 1.3.1 (Wire Protocol 0x04), [online], [searched on Apr. 10, 2013], Internet <URL:https://www.opennetworking.org/images/stories/downloads/sdn-resources/onf-specifications/openflow/openflow-spec-v1.3.1.pdf>

SUMMARY

The following analysis has been given by the present inventors. To enable multicast in an autonomous distributed network as typified by the above IP network, many routers on the network need to be set. Namely, there is a problem that the operation takes much time and effort. For example, in the example in FIG. 6, settings for multicast need to be made on the L3 relay apparatuses that have multicast group management functions. In addition, in an IP network, unicast packets and multicast packets are forwarded in the same layer. Thus, to understand the communication paths of the multicast packets, unicast and multicast path information in an individual router needs to be examined, which makes it difficult to perform analysis work and the like when a failure occurs.

In addition, NPL 2 discloses that it is possible to cause an OpenFlow switch to perform multicast or broadcast by defining a group whose group type is "all" (see section "5.6 Group Table" in NPL 2). However, even with this method, a group table of an individual switch needs to be set, and the operation takes much time and effort.

It is an object of the present invention to provide a control apparatus, a communication system, a relay apparatus control method, and a program that enable multicast easily and conveniently.

According to a first aspect, there is provided a control apparatus, including: a first control unit that configures a first virtual network by setting control information in a relay apparatus(es); a multicast group management unit that holds a configuration(s) of a multicast group(s) configured by an apparatus(es) connected to the relay apparatus(es); a multicast path calculation unit that calculates a path(s) for transmitting a multicast packet(s) to the apparatus(es) that belongs to the multicast group(s) on the basis of information about a topology representing a connection relationship about the relay apparatus(es); and a second control unit that sets control information instructing forwarding of the multicast packet(s) along the path(s) in the relay apparatus(es).

According to a second aspect, there is provided a communication system, including the above control apparatus and the relay apparatus(es) that operates in accordance with control information set by this control apparatus.

According to a third aspect, there is provided a relay apparatus control method, including steps of: causing a control apparatus, which includes: a first control unit that configures a first virtual network by setting control information in a relay apparatus(es); and a multicast group management unit that holds a configuration(s) of a multicast group(s) configured by an apparatus(es) connected to the relay apparatus(es), to calculate a path(s) for transmitting a multicast packet(s) to an apparatus(es) that belongs to the multicast group(s) on the basis of the configuration(s) of the multicast group(s) and information about a topology representing a connection relationship about the relay apparatus(es); and causing the control apparatus to set control information instructing forwarding of the multicast packet(s) along the path(s) in the relay apparatus(es).

This method is associated with a certain machine referred to as a control apparatus that controls a relay apparatus(es).

According to a fourth aspect, there is provided a program, causing a computer, which includes: a first control unit that configures a first virtual network by setting control information in a relay apparatus(es); and a multicast group management unit that holds a configuration(s) of a multicast group(s) configured by an apparatus(es) connected to the relay apparatus(es), to perform processing for: calculating a path(s) for transmitting a multicast packet(s) to an apparatus(es) that belongs to the multicast group(s) on the basis of the configuration(s) of the multicast group(s) and information about a topology representing a connection relationship about the relay apparatus(es); and setting control information instructing forwarding of the multicast packet(s) along the path(s) in the relay apparatus(es). The program may be recorded in a computer-readable (non-transitory) storage medium. Namely, the present invention can be embodied as a computer program product.

The meritorious effects of the present invention are summarized as follows. The present invention enables multicast easily and conveniently. That means that the present invention transforms the communication system into that has a property of facilitating multicast.

PREFERRED MODES

First, an outline of an exemplary embodiment of the present disclosure will be described with reference to the drawing. In the following outline, various elements are denoted by reference characters for the sake of convenience. Namely, the following reference characters are merely used as examples to facilitate understanding of the present disclosure, not to limit the present disclosure to the illustrated modes.

An exemplary embodiment of the present disclosure can be realized by a configuration which includes: a plurality of relay apparatuses (1101 to 1104 in FIG. 2); and a control apparatus (1100 in FIG. 2) that configures a virtual network (first virtual network) by setting control information in these relay apparatuses.

Figure 1:
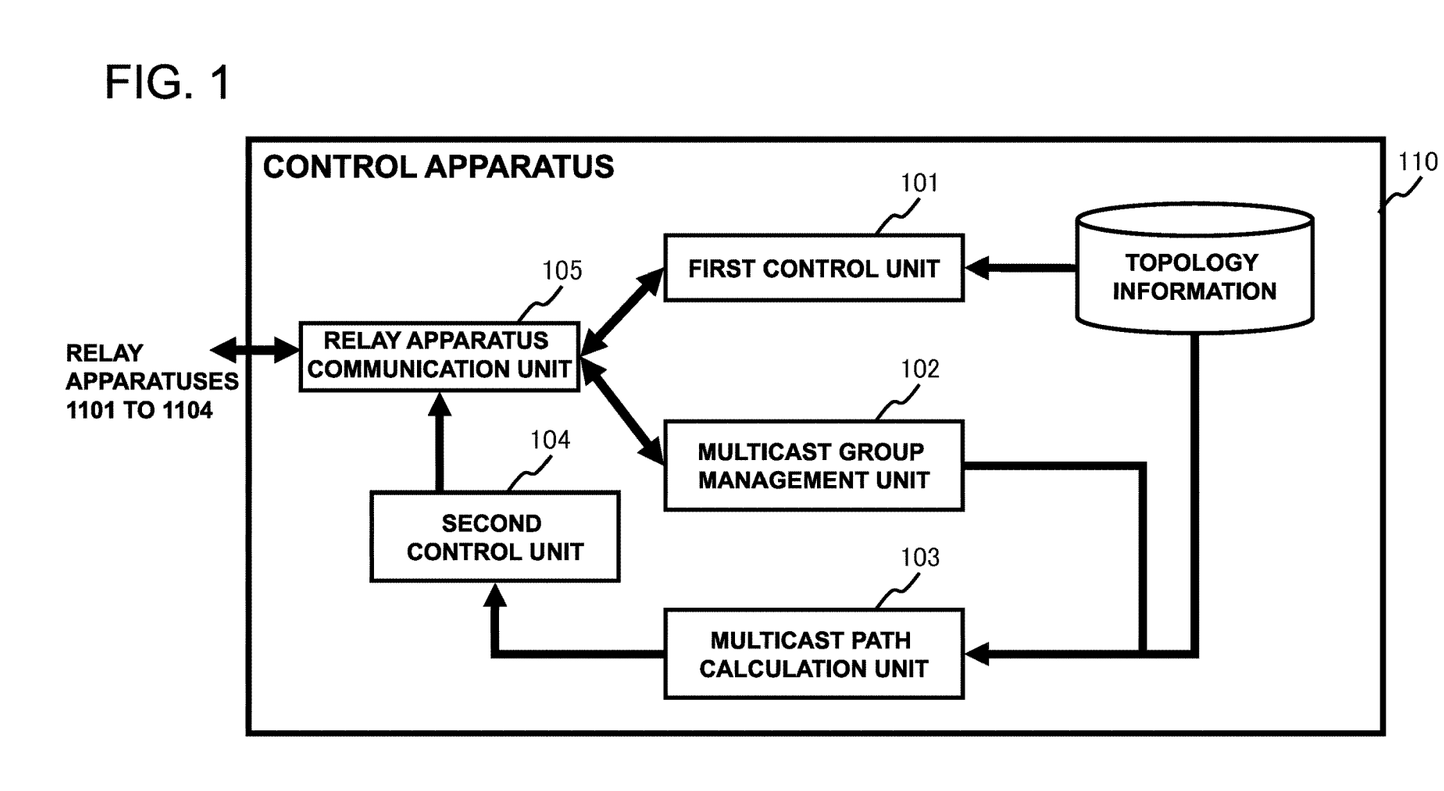
FIG. 1 illustrates a configuration of an exemplary embodiment according to the present disclosure.

More specifically, as illustrated in FIG. 1, the control apparatus includes: a first control unit 101 that configures a first virtual network by setting control information in these relay apparatuses; a multicast group management unit 102 that holds a configuration(s) of a multicast group(s) configured by an apparatus(es) that has requested participation in the multicast group(s) among all apparatuses connected to the relay apparatuses; a multicast path calculation unit 103 that calculates a path(s) for transmitting a multicast packet(s) to the apparatus(es) that belongs to the multicast group(s) on the basis of information about a topology representing a connection relationship about the relay apparatuses; a second control unit 104 that sets control information instructing forwarding of the multicast packet(s) along the path(s) in a relevant one(s) of the relay apparatuses; and a relay apparatus communication unit 105 that exchanges information about the topology and multicast group(s) with the relay apparatuses and that transmits control information.

In this way, it is possible to enable multicast without requiring complex work. In addition, analysis work and the like performed when a failure occurs are facilitated. This is because the control apparatus manages the multicast group(s) and information about the path(s) of the multicast group(s) and sets necessary control information in the relay apparatuses.

FIRST EXEMPLARY EMBODIMENT

Figure 2:
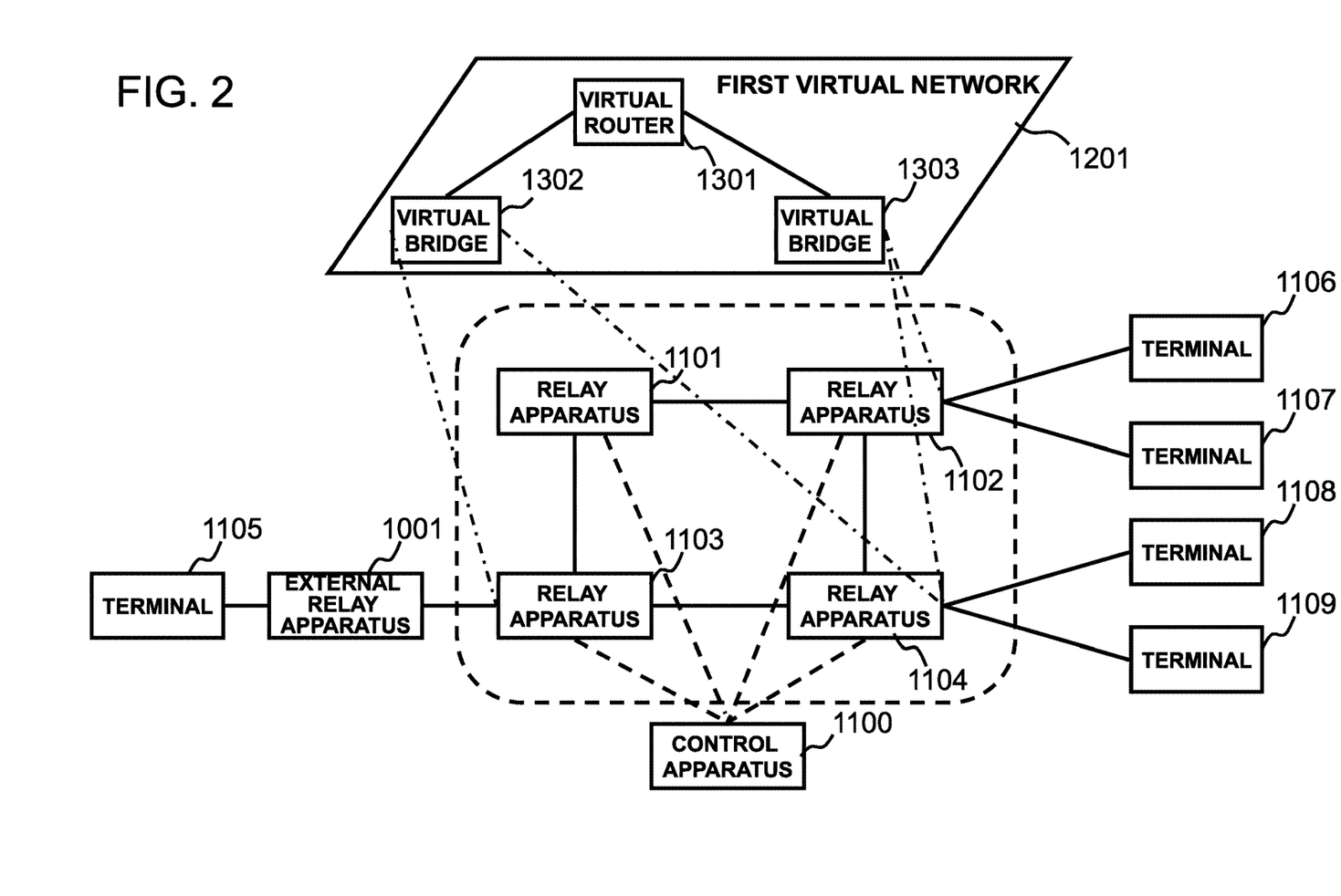
FIG. 2 illustrates a configuration of a communication system according to a first exemplary embodiment of the present disclosure.

Next, a first exemplary embodiment of the present disclosure will be described in detail with reference to the drawings. FIG. 2 illustrates a configuration of a communication system according to the first exemplary embodiment of the present disclosure. The configuration of the communication system illustrated in FIG. 2 includes: a plurality of relay apparatuses 1101 to 1104 that are connected to each other; and a control apparatus 1100 that enables communications among terminals 1105 to 1109 by setting control information in these relay apparatuses 1101 to 1104.

In the example in FIG. 2, an external relay apparatus 1001 is connected between the terminal 1105 and the relay apparatus 1103. However, this external relay apparatus 1001 is not essential. In FIG. 2, dashed lines that extend between the control apparatus 1100 and the relay apparatuses 1101 to 1104 represent control channels, and solid lines that extend among the relay apparatuses 1101 to 1104, the external relay apparatus 1001, and the terminals 1105 to 1109 represent data channels. In addition, dashed-dotted lines that extend between the relay apparatuses 1102 to 1104 and virtual bridges 1302 and 1303 represent that interfaces of these apparatuses are mapped. More specifically, the virtual bridge 1302 is mapped with relevant ports of the relay apparatuses 1103 and 1104, and the virtual bridge 1303 is mapped with relevant ports of the relay apparatuses 1102 and 1104.

The control apparatus 1100 controls the relay apparatuses 1101 to 1104 by setting control information in the relay apparatuses 1101 to 1104 via the respective control channels. In each item of control information, match conditions indicating contents against which header information or the like of received packets is matched are associated with a processing content(s) applied to packets that match the match conditions.

For example, a case in which a configuration of a virtual network 1201 has been set by a user or a virtual network provider as illustrated in the upper portion in FIG. 2 will be described. In this case, the control apparatus 1100 sets control information in the relay apparatus 1103 mapped with the virtual bridge 1302 on the virtual network 1201 so that, when the relay apparatus 1103 receives packets, which are addressed to the terminal 1108 from the terminal 1105, from the external relay apparatus 1001, the relay apparatus 1103 rewrites predetermined header information of the packets before forwarding the packets to the relay apparatus 1104. In addition, the control apparatus 1100 sets control information in the relay apparatus 1104 so that, when the relay apparatus 1104 receives the packets, which are addressed to the terminal 1108 from the terminal 1105, from the relay apparatus 1103, the relay apparatus 1104 forwards the packets to a port connected to the terminal 1108. In this way, the control apparatus 1100 causes the relay apparatuses 1101 to 1104 to behave as if virtual nodes (the virtual router 1301 and the virtual bridges 1302 and 1303) on the first virtual network are operating.

Figure 3:
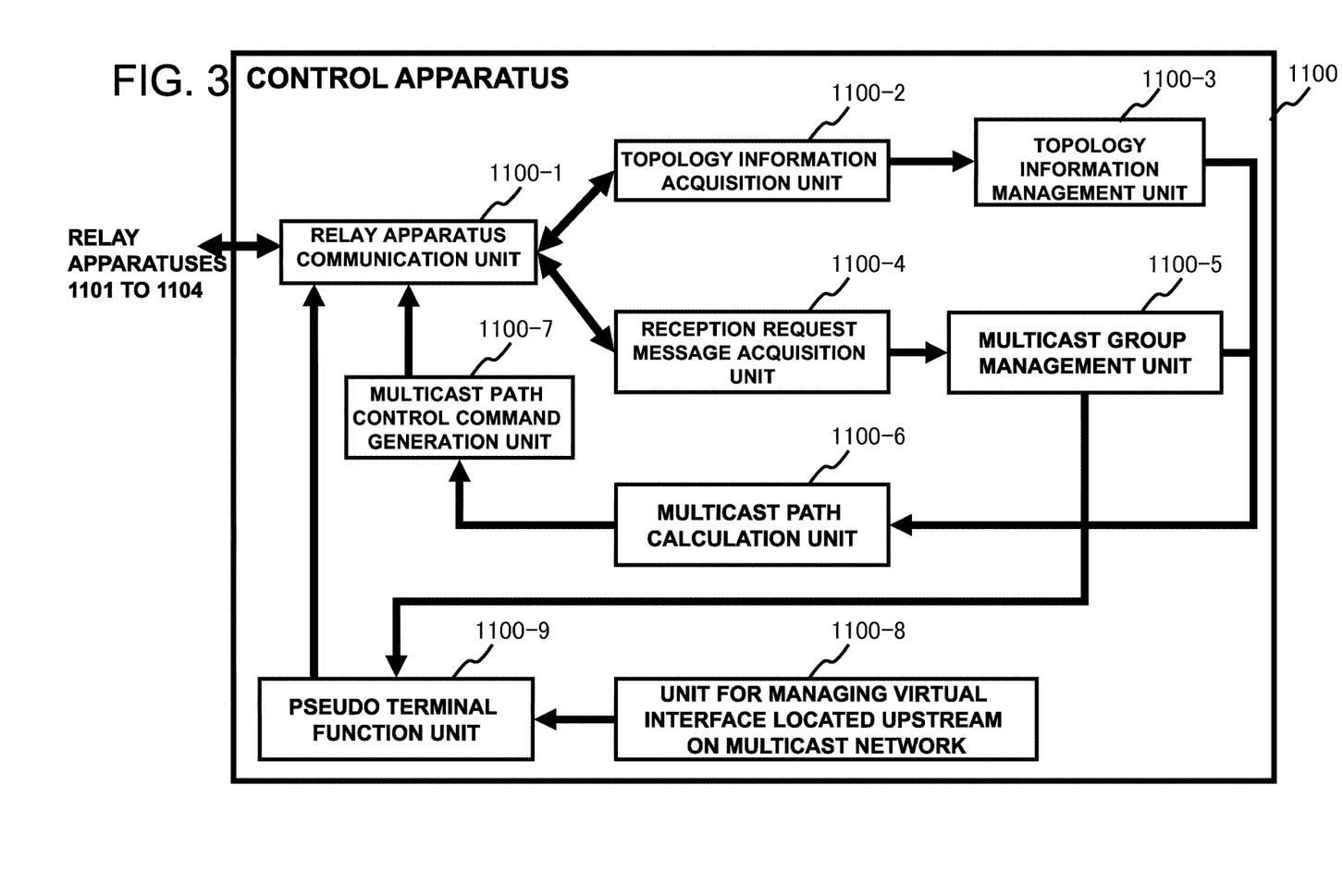
FIG. 3 illustrates a configuration of a control apparatus according to the first exemplary embodiment of the present disclosure.

Next, a detailed configuration of the control apparatus 1100 will be described in detail with reference to the drawings. FIG. 3 illustrates a configuration of the control apparatus according to the first exemplary embodiment of the present disclosure. As illustrated in FIG. 3, the configuration includes: a relay apparatus communication unit 1100-1 that performs control communications with the relay apparatuses; a topology acquisition unit 1100-2 that acquires a topology of the relay apparatuses 1101 to 1104 from the relay apparatus communication unit 1100-1; a topology information management unit 1100-3 that holds the topology; a reception request message acquisition unit 1100-4 that acquires information about a multicast group(s), reception of packets addressed to the multicast group(s) being requested by at least one of the terminals 1105 to 1109, from the corresponding terminal(s) via the relay apparatus communication unit 1100-1; a multicast group management unit 1100-5 that manages a reception-requesting terminal(s) per multicast group; a multicast path calculation unit 1100-6 that calculates a multicast path(s) by referring to the topology of the relay apparatuses 1101 to 1104; a multicast path control command generation unit 1100-7 that generates control commands that realize multicast for the relay apparatuses 1101 to 1104 and transmits the control commands via the relay apparatus communication unit 1100-1; a unit 1100-8 for managing a virtual interface(s) connected upstream on a multicast network in a virtual network (this unit will hereinafter be referred to as an "upstream virtual interface management unit 1100-8," as needed); and a pseudo terminal function unit 1100-9 that behaves as a multicast-packet receiving terminal in a pseudo manner. In FIG. 3, processing means (corresponding to the first control unit 101 in FIG. 1) for calculating unicast paths and creating control information in the first virtual network illustrated in the upper portion in FIG. 2 is not illustrated.

The relay apparatus communication unit 1100-1 establishes control sessions and exchanges control commands with the relay apparatuses 1101 to 1104. If OpenFlow switches in NPL 2 are used as the relay apparatuses 1101 to 1104, control messages defined by the OpenFlow protocol in NPL 2 can be used as the control commands. The relay apparatus communication unit 1100-1 may communicate with the relay apparatuses 1101 to 1104 by using SNMP (Simple Network Management Protocol) or CLI via Telnet.

The topology acquisition unit 1100-2 acquires a topology of the relay apparatuses 1101 to 1104 on the basis of information collected from the relay apparatuses 1101 to 1104 via the relay apparatus communication unit 1100-1. To acquire the topology, the relay apparatuses 1101 to 1104 may be caused to transmit recognition information about their neighboring relay apparatus(es). The Link Layer Discovery Protocol is a typical example of such protocol used for recognizing connection among switches. The control apparatus 1100 may cause a certain port(s) of a certain relay apparatus(es) to output a packet including an ID(s) and a port number(s) of the relay apparatus(es) and may cause a correspondent relay apparatus(es) to notify the control apparatus 1100 of reception of the packet. In this way, too, connection among switches can be recognized. Packet-out and packet-in messages in NPL 2 may be used for such packet output instructions outputted from the control apparatus 1100 and packet reception notifications supplied to the control apparatus 1100. In addition, if the topology of the relay apparatuses 1101 to 1104 is known, the topology may be set in advance in the topology information management unit 1100-3. On the basis of such a physical network topology acquired as described above, the control apparatus 1100 performs mapping with endpoints on a virtual network. In this way, the control apparatus 1100 can control logically-sliced virtual networks.

The topology information management unit 1100-3 holds the topology acquired by the topology acquisition unit 1100-2 and supplies the topology to the multicast path calculation unit 1100-6.

The reception request message acquisition unit 1100-4 acquires information about a multicast group(s), reception of packets addressed to the multicast group(s) being requested by at least one of the terminals, from the corresponding terminal(s). To acquire such information, the control apparatus 1100 may cause an individual relay apparatus to transmit (forward) a message requesting reception of packets addressed to a multicast group, the message transmitted from a corresponding terminal(s). The control apparatus 1100 may transmit a query to an individual terminal about a group that the individual terminal requests and cause a corresponding relay apparatus to transmit (forward) information about the group. IGMP (Internet Group Management Protocol) and MLD (Multicast Listener Discovery) are typical examples of such protocols used for managing multicast groups.

For example, the control apparatus 1100 causes a relay apparatus, which is connected to a terminal, to forward an IGMP or MLD Report packet, which has been transmitted from the terminal, to the control apparatus 1100. In this way, the control apparatus 1100 can acquire information about a multicast group, reception of packets addressed to the multicast group being requested by the terminal. In addition, the control apparatus 1100 may cause a certain port(s) of a certain relay apparatus(es) to output an IGMP or MLD General Query packet regularly and cause a correspondent relay apparatus(es) to transmit (forward) an IGMP or MLD Report packet. Packet-out and packet-in messages in NPL 2 may be used for such packet output instructions outputted from the control apparatus 1100 and packet reception notifications supplied to the control apparatus 1100. If a terminal (s) requesting reception of messages addressed to a certain multicast group(s) is known, such multicast group(s) may be set in advance.

Figure 6:
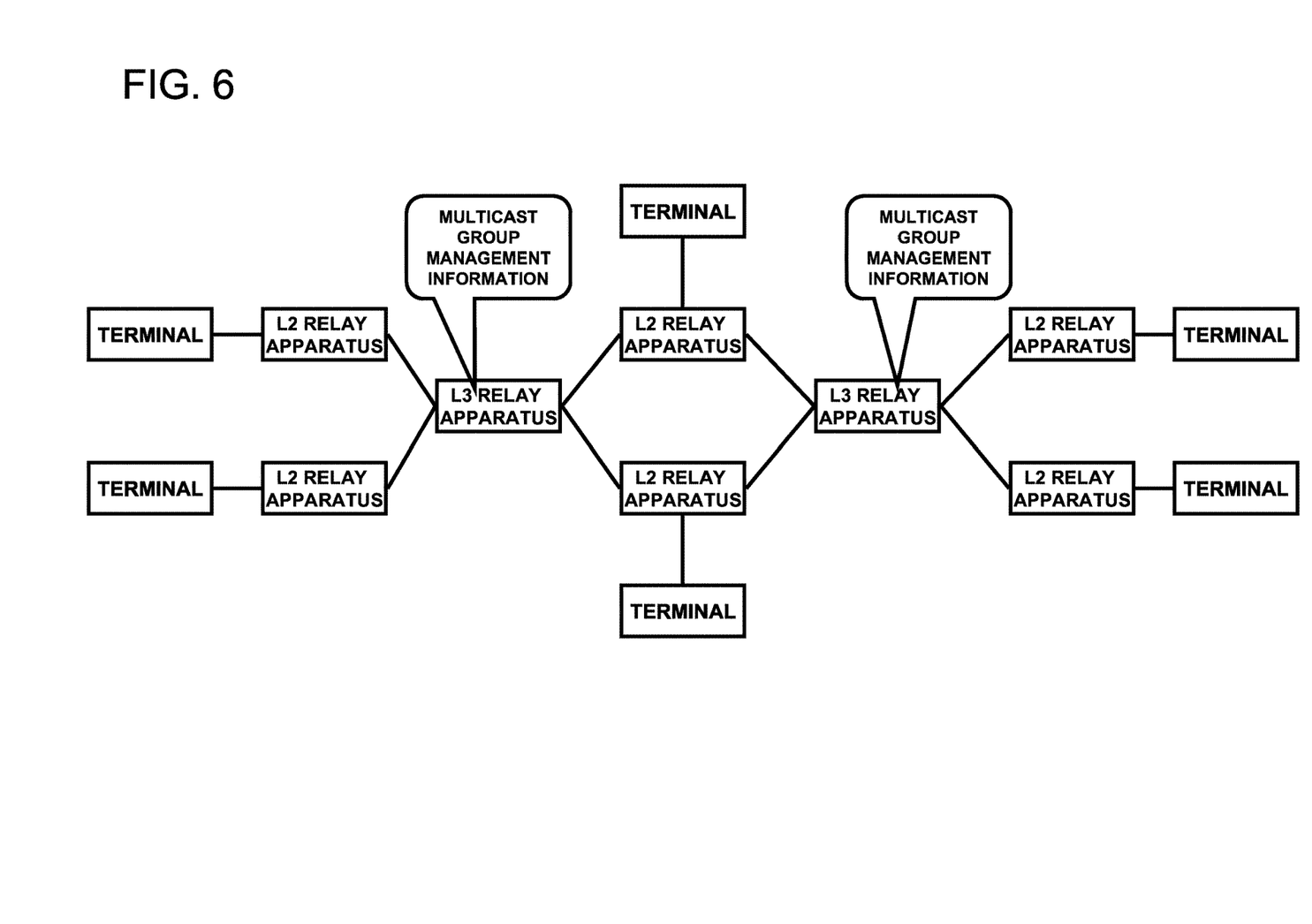
FIG. 6 is a diagram for illustrating a multicast communication in an autonomous distributed network.

The multicast group management unit 1100-5 manages information about a multicast group(s) acquired by the reception request message acquisition unit 1100-4, reception of messages addressed to the multicast group(s) being requested by at least one of the terminals. The multicast group management unit 1100-5 does not manage multicast groups per router such as an L3 relay apparatus or per L2 switch as illustrated in FIG. 6 but manages multicast groups and receiving terminals per virtual network.

Figure 4:
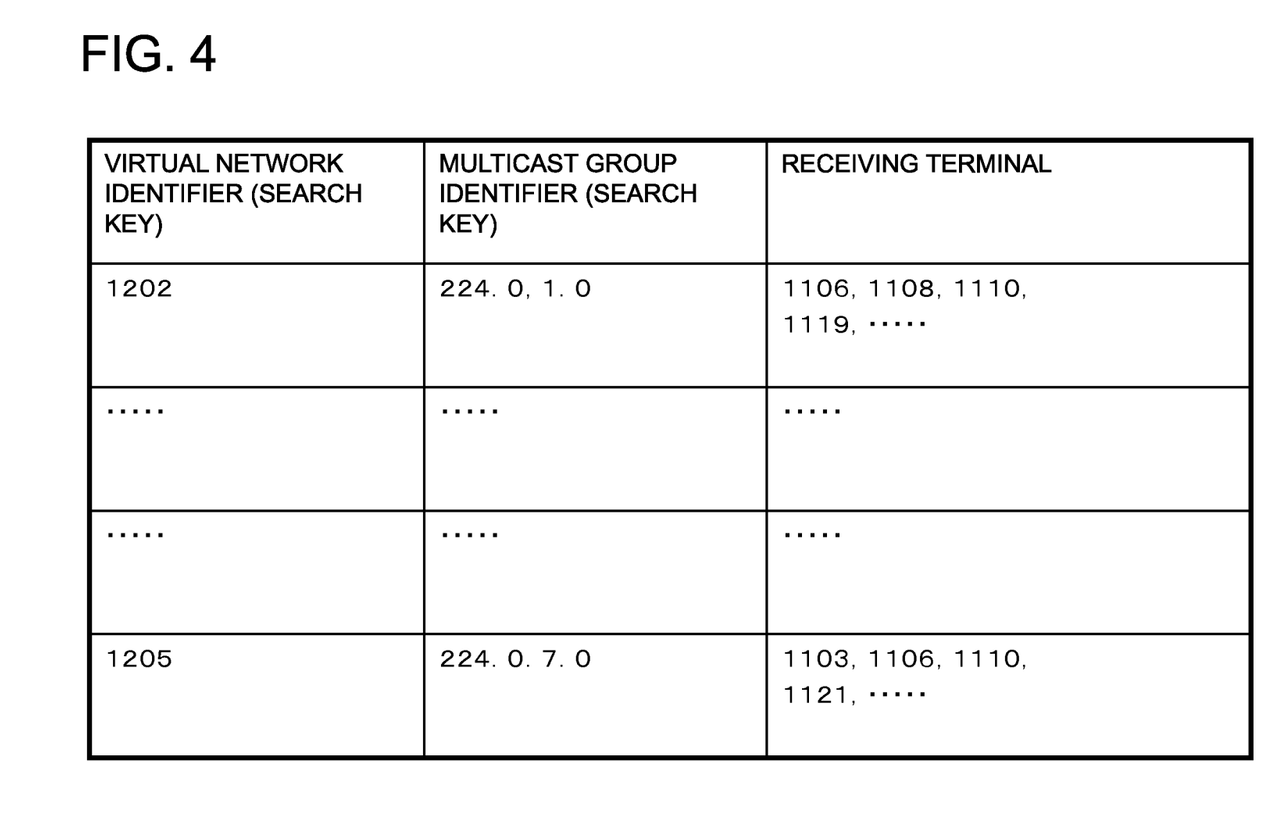
FIG. 4 illustrates exemplary multicast group information held in the control apparatus according to the first exemplary embodiment of the present disclosure.

FIG. 4 illustrates exemplary multicast group information managed in the multicast group management unit 1100-5. In the example in FIG. 4, in each entry, a virtual network identifier that uniquely determines a virtual network, a multicast group identifier that uniquely determines a multicast group, and a group of terminals that request reception of messages addressed to the corresponding multicast group are associated with each other. In the example in FIG. 4, while reference numbers in FIG. 2 are used as the information about the terminals, information about physical positions of the terminals may be used as the information about the terminals. For example, a combination of an ID and a port of a relay apparatus connected to a terminal(s) may be used as the information about the terminal(s).

By using the information supplied from the topology information management unit 1100-3 and the multicast group management unit 1100-5, the multicast path calculation unit 1100-6 calculates a communication path(s) from the source terminal of a multicast group to a terminal(s) that requests reception of corresponding multicast packets. For example, if the terminal 1105 connected to the external relay apparatus 1001 is the source terminal of a multicast group whose multicast group identifier is "224.0.1.0" (see the top entry in FIG. 4), the multicast path calculation unit 1100-6 calculates a path that leads to the terminal 1106 by using the external relay apparatus 1001 as a start point. The multicast path calculation unit 1100-6 also calculates a multicast path that leads to the terminals 1108, 1110, and 1119 in FIG. 4 (the terminals 1110 and 1119 are not illustrated in FIG. 2).

Each of the multicast paths may be calculated per multicast group. Alternatively, if the start and end points of a path match those of a previously calculated path, the previously calculated path may be used. However, if a plurality of terminals are connected to a certain relay apparatus, it is desirable that care be taken so that corresponding multicast packets are not forwarded to any terminals that are not included in the target multicast group.

The multicast path control command generation unit 1100-7 generates a multicast path control command(s) for setting control information for instructing a relay apparatus(s) on the calculated multicast path(s) to forward corresponding multicast packets on the path(s) and transmits the multicast path control command(s) to the relay apparatus(s). If the destination terminal(s) varies from multicast group to multicast group, at least a destination address(es) corresponding to a multicast group identifier(s) may be specified as a match condition in the corresponding control information. An IP address or a MAC (Media Access Control) address may be used as such destination address. In addition, a FlowMod message in NPL 2 for setting a flow entry in a relay apparatus may be used as a multicast path control command.

In the present exemplary embodiment, multicast packets are forwarded by using a multicast-forwarding virtual network 1202 different from the unicast-forwarding virtual network 1201.

Figure 5:
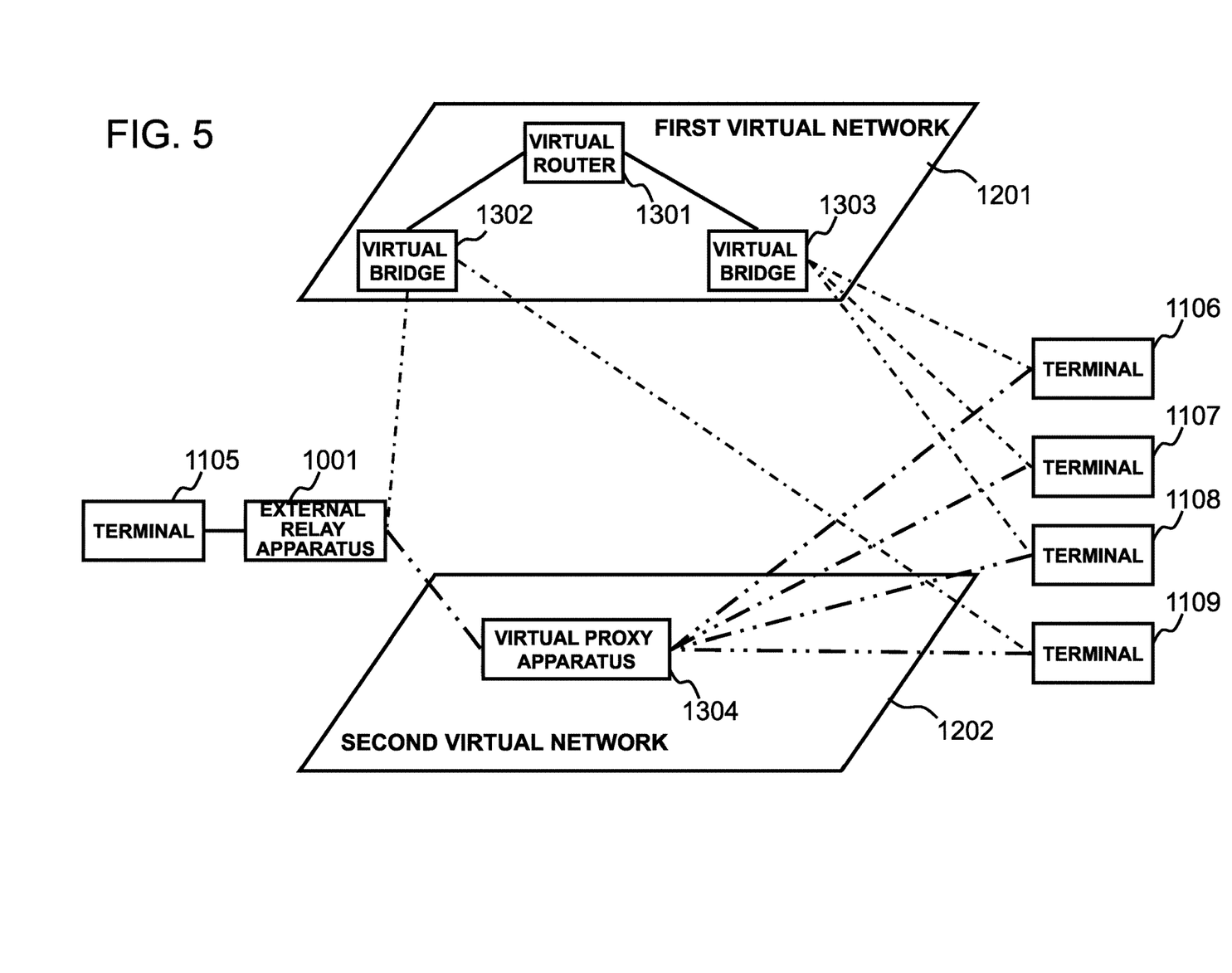
FIG. 5 schematically illustrates virtual networks configured by the control apparatus according to the first exemplary embodiment of the present disclosure.

FIG. 5 schematically illustrates the two virtual networks 1201 and 1202 configured by the control apparatus 1100. In the multicast forwarding virtual network (second virtual network) 1202, a virtual proxy apparatus 1304 is arranged. The terminals 1106 to 1109 and the external relay apparatus 1001 connected to the virtual bridges in the unicast forwarding virtual network (first virtual network) 1201 are connected to the virtual proxy apparatus 1304 via virtual interfaces, respectively. The control apparatus 1100 uses multicast path control commands to set control information that instructs outputting multicast packets after rewriting the source address thereof. In this way, a receiver(s) (a terminal(s)) of the multicast packets can recognize that the multicast packets have been forwarded via the virtual proxy apparatus 1304. For example, by rewriting the source MAC address of multicast packets to the virtual MAC address of the virtual proxy apparatus 1304, the receiver(s) can recognize that these multicast packets have been transmitted from the virtual proxy apparatus 1304. Regarding the virtual MAC address of the virtual proxy apparatus 1304, a separate MAC address may be used per virtual proxy apparatus or the same MAC address may be used by all virtual proxy apparatuses.

The upstream virtual interface management unit 1100-8 manages a virtual interface located in the direction of a multicast packet source terminal, namely, located upstream on the multicast network. The virtual interface located upstream on the multicast network may be set manually by using a CLI (Command Line Interface). While the upstream virtual interface is connected to the external relay apparatus 1001 in the present exemplary embodiment (see the two-dot chain line between the external relay apparatus 1001 and the virtual proxy apparatus 1304 in FIG. 5), the upstream virtual interface may be directly connected to the multicast packet source terminal (for example, the terminal 1105). A plurality of upstream virtual interfaces may be arranged on a single virtual network.

The pseudo terminal function unit 1100-9 requests an apparatus located upstream on the multicast network (for example, the external relay apparatus 1101) to start transmission of multicast packets addressed to a multicast group in which a reception requesting terminal(s) exists. Such a multicast group in which a reception requesting terminal(s) exists can be determined by referring to the multicast group management unit 1100-5. More specifically, on the basis of the information in the upstream virtual interface management unit 1100-8, the control apparatus 1100 causes a certain port of the relay apparatus 1103, to which the upstream virtual interface is connected, to output an IGMP or MLD Report packet. In this way, the pseudo terminal function unit 1100-9 requests start of forwarding multicast packets.

In addition, the pseudo terminal function unit 1100-9 responds to heartbeat check packets, which are addressed to terminals from an apparatus located upstream on the multicast network. More specifically, when the control apparatus 1100 is notified of reception of IGMP or MLD General Query packets, which are transmitted regularly from the external relay apparatus 1001 to check whether terminals in multicast groups are alive, the control apparatus 1100 causes the relay apparatus 1103 to output IGMP or MLD Report packets of the corresponding multicast groups to the upstream virtual interface. In this way, whether the corresponding terminals are alive is checked.

Packet-out and packet-in messages in NPL 2 may be used for the packet output instructions outputted from the control apparatus 1100 to the relay apparatus and the packet reception notifications.

In the present exemplary embodiment, since the control apparatus 1100 behaves as a multicast-packet receiving terminal in a pseudo manner as described above, the control apparatus 1100 can request the start of transmission of multicast packets and respond to heartbeat check packets addressed to terminals, without causing the relay apparatuses 1101 to 1104 to request the start of transmission from terminals or forward the heartbeat check responses.

The present exemplary embodiment has been described assuming that the data communication paths (see the solid lines in FIG. 2) and the control communication paths (see the dashed lines in FIG. 2) are separately arranged. However, these two kinds of paths may be mixed. In addition, the present exemplary embodiment has been described assuming that four relay apparatuses, five terminals, and one external relay apparatus are arranged. However, the number of components of any kind is not limited.

Each unit (processing means) in the control apparatus 1100 illustrated in FIG. 3 may be realized by a computer program which causes a computer that constitutes the control apparatus 1100 to use its hardware and perform corresponding processing described above.

Next, an operation according to the present exemplary embodiment will be described in detail with reference to the drawings. In this operation, a certain terminal requests to receive multicast packets addressed to a multicast group, and the multicast packets addressed to the multicast group are forwarded to the terminal.

The following description will be made assuming that the terminal 1105 is the sender of the multicast packets addressed to the multicast group. As a preparation, a virtual interface upstream on the multicast network is set. By using a CLI, a virtual interface between the external relay apparatus 1001 and the virtual proxy apparatus 1304 is set as the virtual interface upstream on the multicast network. The upstream virtual interface management unit 1100-8 holds the specified virtual interface as the upstream virtual interface.

Next, the control apparatus 1100 asks the terminals 1106 to 1109 whether the terminals 1106 to 1109 request reception of the multicast packets addressed to the multicast group. More specifically, the control apparatus 1100 instructs the relay apparatuses 1102 connected to the terminals 1106 and 1107 to transmit an IGMP or MLD General Query packet to the terminals 1106 and 1107. In addition, the control apparatus 1100 instructs the relay apparatuses 1104 to transmit an IGMP or MLD General Query packet to the terminals 1108 and 1109. In this way, an IGMP or MLD Query packet is transmitted to the terminals 1106 to 1109.

The following description will be made assuming that the terminal 1106 has requested to receive the multicast packets addressed to the multicast group. When the terminal 1106, which has requested to receive the multicast packets addressed to multicast group #1, receives an IGMP or MLD General Query packet, the terminal 1106 transmits an IGMP or MLD Report to the relay apparatus 1102.

When the relay apparatus 1102 receives the IGMP or MLD Report packet from the terminal 1106, the relay apparatus 1102 forwards the IGMP or MLD Report to the control apparatus 1100. When the control apparatus 1100 receives the IGMP or MLD Report packet from the terminal 1106, the control apparatus 1100 adds the terminal 1106 to the receiving terminals included in the multicast group (#1) whose virtual network identifier managed in the multicast group management unit 1100-5 is 1202 (see FIG. 4).

The control apparatus 1100 performs path calculation on the basis of the information in the topology information management unit 1100-3 and the multicast group management unit 1100-5 and issues multicast path control commands to the relay apparatuses on the paths, so that the multicast packets addressed to the multicast group are also forwarded to the terminal 1106.

In addition, to notify the external relay apparatus 1001 of the addition of the new receiving terminal to the group, the control apparatus 1100 instructs the relay apparatus 1103 to transmit an IGMP or MLD Report packet from a port connected to the external relay apparatus 1001.

In this way, when the sender (the terminal 1105) transmits a multicast packet, the multicast packet is transmitted to the relay apparatus 1103 via the external relay apparatus 1001. The relay apparatus 1103 forwards the packet along the multicast path set by the multicast path control command generation unit 1100-7. For example, if a path that extends through the relay apparatuses 1103, 1101, and 1102 in FIG. 2 has been calculated as the multicast path, the multicast packet is transmitted to the terminal 1106 via the relay apparatus 1103, 1101, and 1102 in this order. In addition, since the source MAC address in a header of the multicast packet is rewritten in the process of this forwarding, the multicast packet forwarded by the relay apparatuses 1101 to 1103 is recognized by the terminal 1106 as a multicast packet forwarded by the virtual proxy apparatus 1304 on the second virtual network 1202 in FIG. 5.

As described above, according to the present exemplary embodiment, multicast can be performed via a multicast-only virtual network (second virtual network) obtained by logically dividing (slicing) a physical network. As a result, the number of multicast routers can be reduced. In addition, operational burden such as for configuration input operations (setting operations) for enabling these multicast routers to perform multicast forwarding can be eliminated.

In addition, according to the present exemplary embodiment, multicast paths can be determined more easily. This is because a multicast-only virtual network (second virtual network) is arranged and paths can be determined on the multicast-only virtual network. More specifically, among all the control information set in the relay apparatus(es) on the path(s) on the multicast-only virtual network (second virtual network), control information including a multicast group identifier as a match condition is extracted. In this way, the corresponding flow statistical information can be referred to.

In addition, according to the present exemplary embodiment, within the centralized-control-type network including the relay apparatuses 1101 to 1104, multicast packets can be forwarded, without using a multicast routing protocol. This is because the upstream virtual interface management unit 1100-8 and the pseudo terminal function unit 1100-9 are arranged and the control apparatus 1100 requests the start of transmission of multicast packets and responds to heartbeat check packets in place of a terminal(s) that belongs to a multicast group(s).

While an exemplary embodiment(s) of the present invention has thus been described, the present invention is not limited thereto. Further variations, substitutions, or adjustments can be made without departing from the basic technical concept of the present invention. For example, the configurations of the networks and elements illustrated in the drawings are used only as examples to facilitate understanding of the present invention. Namely, the present invention is not limited to the configurations illustrated in the drawings.

Finally, suitable modes of the present invention will be summarized.

[Mode 1]
(See the Control Apparatus According to the Above First Aspect)

[Mode 2]
The control apparatus according to mode 1, further including a reception request message acquisition unit that collects a message(s) requesting reception of a multicast packet(s) addressed to a multicast group and notifies the multicast group management unit of the message(s).

[Mode 3]
The control apparatus according to mode 2;
wherein the message(s) requesting reception of a multicast packet(s) addressed to a multicast group is collected by setting control information instructing forwarding of the message(s) requesting reception of a multicast packet(s) to a multicast group in the relay apparatus(s).

[Mode 4]

The control apparatus according to mode 2 or 3; wherein the control apparatus asks an apparatus(es) connected to the relay apparatus(es) whether the apparatus(es) requests to receive a multicast packet(s) addressed to a multicast group via the relay apparatus(es).

[Mode 5]

The control apparatus according to any one of modes 1 to 4;
wherein the relay apparatus(es) is caused to rewrite a source address of a multicast packet(s) to an address of a predetermined virtual proxy apparatus before forwarding the multicast packet(s).

[Mode 6]

The control apparatus according to any one of modes 1 to 5, further including a pseudo terminal function unit that performs a communication(s) on the basis of a multicast protocol, in place of a receiving terminal(s) of an arbitrary multicast group(s).

[Mode 7]

The control apparatus according to mode 6, further including a unit for managing a virtual interface(s) located upstream on a multicast network, the virtual interface(s) being connected to a source apparatus per multicast group; wherein the virtual proxy apparatus communicates with a source apparatus(es) by referring to the unit for managing a virtual interface(s) located upstream on a multicast network.

[Mode 8]
(See the Communication System According to the Above Second Aspect)

[Mode 9]
(See the Relay Apparatus Control Method According to the Above Third Aspect)

[Mode 10]
(See the Program According to the Above Fourth Aspect)

Modes 8 to 10 can be expanded in the same way as mode 1 is expanded to modes 2 to 7.

The disclosure of each of the above NPLs is incorporated herein by reference thereto. Modifications and adjustments of the exemplary embodiments and examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the entire disclosure of the present invention. Namely, the present invention of course includes various variations and modifications that could be made by those skilled in the art according to the entire disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

REFERENCE SIGNS LIST 101 first control unit
102 multicast group management unit
103 multicast path calculation unit
104 second control unit
105 relay apparatus communication unit
110, 1100 control apparatus
1001 external relay apparatus
1101 to 1104 relay apparatus
1105 to 1109 terminal
1201 first virtual network
1202 second virtual network
1301 virtual router
1302, 1303 virtual bridge
1304 virtual proxy apparatus
1100-1 relay apparatus communication unit
1100-2 topology acquisition unit
1100-3 topology information management unit
1100-4 reception request message acquisition unit
1100-5 multicast group management unit
1100-6 multicast path calculation unit
1100-7 multicast path control command generation unit
1100-8 unit for managing a virtual interface(s) located upstream on a multicast network (upstream virtual interface management unit)
1100-9 pseudo terminal function unit

The invention claimed is:

1. A control apparatus, comprising:
a memory storing instructions; and a processor configured to execute the instructions to:
configure a first virtual network and a second virtual network by setting first control information in a plurality of relay apparatuses;
hold a configuration of a multicast group configured by a first apparatus connected to at least one of the plurality of relay apparatuses;
calculate a first path over the first virtual network for transmitting a multicast packet to the first apparatus on the basis of information about a topology of the plurality of relay apparatuses;
set second control information instructing forwarding of the multicast packet along the first path in a first relay apparatus, which operates as a virtual proxy apparatus on the second virtual network, among the plurality of relay apparatuses; and
perform a communication on the basis of a multicast protocol, in place of a receiving terminal of an arbitrary multicast group, wherein
the second control information includes an instruction to give information to the multicast packet, the information indicating that a sender of the multicast packet is the virtual proxy apparatus,
the control apparatus causes one of the plurality of relay apparatuses to operate as a virtual router and another of the plurality of relay apparatuses to operate as a virtual bridge on the first virtual network, and
the control apparatus causes the first relay apparatus which is mapped with the virtual bridge on the first virtual network to operate as the virtual proxy apparatus on the second virtual network,
wherein the first relay apparatus operates as the virtual proxy apparatus by rewriting a source address of the multicast packet to a virtual source address of the virtual proxy apparatus in accord with the second control information.

2. The control apparatus according to claim 1, wherein the processor is further configured to execute the instruction to:
collect a message requesting reception of a multicast packet addressed to a multicast group.

3. The control apparatus according to claim 2, wherein the message requesting reception of a multicast packet addressed to a multicast group is collected by setting, in the first relay apparatus, the second control information instructing forwarding of the message requesting reception of a multicast packet to a multicast group.

4. The control apparatus according to claim 3,
wherein a packet for asking the first apparatus whether the first apparatus requests to receive a multicast packet addressed to a multicast group is transmitted to the first apparatus via the the first relay apparatuses.

5. The control apparatus according to claim 3, wherein the first relay apparatus is caused to rewrite the source address of a multicast packet to the virtual source address of the virtual proxy apparatus before forwarding the multicast packet.

6. The control apparatus according to claim 2,
wherein a packet for aking the first apparatus whether the first apparatus requests to receive a multicast packet addressed to a multicast group is transmitted to the first apparatus via the plurality of relay apparatuses.

7. The control apparatus according to claim 6, wherein the first relay apparatus is caused to rewrite the source address of a multicast packet to the virtual source address of the virtual proxy apparatus before forwarding the multicast packet.

8. The control apparatus according to claim 2, wherein the first relay apparatus is caused to rewrite the source address of the multicast packet to the virtual source address of the virtual proxy apparatus before forwarding the multicast packet.

9. The control apparatus according to claim 1, wherein the first relay apparatus is caused to rewrite the source address of the multicast packet to the virtual source address of the virtual proxy apparatus before forwarding the multicast packet.

10. The control apparatus according to claim 1, wherein when the first virtual network includes a plurality of multicast groups, the processor is further configured to execute the instructions to:
manage a virtual interface located upstream on a multicast network, the virtual interface being connected to a source apparatus per a multicast group,
wherein the virtual proxy apparatus communicates with the respective source apparatus by referring to the control apparatus for managing the virtual interface located upstream on the multicast network.

11. The control apparatus according to claim 1, wherein the processor is configured to perform the communication on the basis of a multicast protocol by:
sending a transmission start request to a sender of the multicast packet; and
responding to a heartbeat from the sender of the multicast packet,
wherein the multicast packet is transferred by using a multicast path set in the first relay apparatus.

12. A communication system, comprising:
a control apparatus including: a memory storing instructions; and a processor configured to execute the instruction to:
configure a first virtual network and a second virtual network by setting first control information in a plurality of realy apparatuses,
hold a configuration of a multicast group configured by a first apparatus connected to at least one of the plurality of relay apparatuses,
calculate a first path over the first virtual network for transmitting a multicast packet to the first apparatus on the bases of information about a topology of the plurality of relay apparatuses,
set second control information instructing forwarding of the multicast packet along the first path in a first relay apparatus, which operates as a virtual proxy apparatus on the second virtual network, amount the plurality of realy apparatuses, and
perform a communication on the basis of a multicast protocol, in place of a receiving terminal of an arbirtary multicast group, wherein:
the second control information includes an instruction to give information to the multicast packet, the information indicating that a sender of the multicast packet is the virtual proxy apparatus;
the plurality of the relay apparatuses operate in accordance with the first and second control information set by the control apparatus,
the control apparatus causes one of the plurality of relay apparatuses to operate as a virtual router and another of the plurality of relay apparatuses to operate as a virtual bridge on the first virtual network, and
the control apparatus causes the first relay apparatus which is mapped with the virtual bridge on the first virtual network to operate as the virtual proxy apparatus on the second virtual network,
wherein the first relay apparatus opeates as the virtual proxy apparatus by rewriting a source address of the multicast packet to a virtual source address of the virtual proxy apparatus in accord with the second control information.

13. A relay apparatus control method performed by a control apparatus, wherein the control apparatus configures a first virtual network and a second virtual network by setting first control information in a plurality of relay apparatuses, and holds a configuration of a multicast group configured by a first apparatus connected to at least one of the plurality of realy apparatuses, the relay apparatus control method comprising:
calculating a first path over the first virtual network for transmitting a multicast packet to the first apparatus on the bases of the configuration of the multicast group and information about a topology of the plurality of relay apparatuses;
setting second control information instructing forwarding of the multicast packet along the first path in a first relay apparatus, which operates as a virtual proxy apparatus on the second virtual neetwork, among the plurality of relay apparatuses; and
performing a communication on the basis of a multicast protocol, in place of a receiving terminal of an arbitrary multicast group, wherein:
the second control information includes an instruction to give information to the multicast packet, the information indicating that a sender of the multicast packet is the virtual proxy apparatus,
the control apparatus causes one of the plurality of realy apparatuses to operate as a virtual router and another of the plurality of relay apparatuses to operate as a virtual bridge on the first virtual network, and
the control apparatus causes the first relay apparatus which is mapped with the virtual bridge on the first virtual network to operate as the virtual proxy apparatus on the second virtual network,
wherein the first relay apparatus operates as the virtual proxy apparatus by rewriting a source address of the multicat packet to a virtual source address of the virtual proxy apparatus in accord with the second control information.

* * * * *

UNITED STATES PATENT AND TRADEMARK OFFICE
CERTIFICATE OF CORRECTION

PATENT NO. : 10,742,539 B2
APPLICATION NO. : 14/894632
DATED : August 11, 2020
INVENTOR(S) : Shimada et al.

It is certified that error appears in the above-identified patent and that said Letters Patent is hereby corrected as shown below:

In the Claims

Claim 2, Column 12, Line 59, "execute the instruction" should read --execute the instructions--.

Claim 4, Column 13, Line 5, "via the the first relay apparatuses" should read --via the first relay apparatus--.

Claim 6, Column 13, Line 12, "aking" should read --asking--.

Claim 12, Column 13, Line 57, "realy" should read --relay--.

Claim 12, Column 13, Line 63, "the bases" should read --the basis--.

Claim 12, Column 14, Lines 2-3, "amount the plurality of realy apparatuses" should read --among the plurality of relay apparatuses--.

Claim 12, Column 14, Line 5, "arbirtary" should read --arbitrary--.

Claim 12, Column 14, Line 11, "plurality of the" should read --plurality of--.

Claim 12, Column 14, Line 23, "opeates" should read --operates--.

Claim 13, Column 14, Line 34, "realy" should read --relay--.

Claim 13, Column 14, Line 38, "the bases" should read --the basis--.

Claim 13, Column 14, Line 44, "neetwork" should read --network--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,742,539 B2

Claim 13, Column 14, Line 53, "realy" should read --relay--.

Claim 13, Column 14, Line 63, "multicat" should read --multicast--.